United States Patent
Chatterjee et al.

(10) Patent No.: US 12,407,760 B1
(45) Date of Patent: Sep. 2, 2025

(54) DEVICE MANAGER

(71) Applicant: Infineon Technologies AG, Neubiberg (DE)

(72) Inventors: Arkajyoti Chatterjee, Kolkata (IN); Chirayu Shrikant Mahajan, Bengaluru (IN); Swarnam Panday, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 6 days.

(21) Appl. No.: 18/592,419

(22) Filed: Feb. 29, 2024

(51) Int. Cl.
*G06F 15/16* (2006.01)
*H04L 67/141* (2022.01)
*H04L 67/146* (2022.01)

(52) U.S. Cl.
CPC .......... *H04L 67/141* (2013.01); *H04L 67/146* (2013.01)

(58) Field of Classification Search
CPC ............................ H04L 67/141; H04L 67/146
USPC ......................................................... 709/227
See application file for complete search history.

(56) References Cited

U.S. PATENT DOCUMENTS

| | | | | |
|---|---|---|---|---|
| 8,160,050 B2* | 4/2012 | Lee | ...................... | H04L 12/185 370/312 |
| 8,316,237 B1* | 11/2012 | Felsher | ................. | H04L 63/061 380/282 |
| 9,924,551 B2* | 3/2018 | Lee | ......... | H04W 76/14 |
| 10,027,649 B2* | 7/2018 | Beecham | ................ | H04L 67/02 |
| 10,084,794 B2* | 9/2018 | Goldfarb | ............... | H04L 63/104 |
| 11,005,935 B1* | 5/2021 | Littlefield | ............ | G06F 11/1464 |
| 11,281,394 B2* | 3/2022 | Hankins | ................ | G06F 3/0604 |
| 11,301,407 B2* | 4/2022 | Sen | ......... | G06F 3/0619 |
| 11,321,222 B2 | 5/2022 | Moran et al. | | |
| 11,743,342 B2* | 8/2023 | Lee | ......... | H04L 69/322 709/228 |
| 11,902,372 B1* | 2/2024 | Horowitz | ............... | H04L 67/146 |
| 11,995,336 B2* | 5/2024 | Margaglia | ........... | G06F 11/2066 |
| 2010/0246417 A1* | 9/2010 | Cheng | .................. | H04W 48/18 370/252 |
| 2016/0278144 A1* | 9/2016 | Lee | ......... | H04L 67/146 |
| 2019/0104403 A1* | 4/2019 | Sharma | ................ | H04L 67/148 |
| 2019/0354628 A1* | 11/2019 | Grunwald | ........... | G06F 11/2097 |
| 2022/0255998 A1* | 8/2022 | Lee | ......... | H04L 67/1021 |
| 2023/0359532 A1* | 11/2023 | Freilich | ............... | H04L 67/1097 |
| 2024/0419366 A1* | 12/2024 | Karr | ......... | G06F 3/0605 |

\* cited by examiner

*Primary Examiner* — Moustafa M Meky
(74) *Attorney, Agent, or Firm* — Harrity & Harrity, LLP

(57) ABSTRACT

In some implementations, a device manager may detect a connection between a node device and a host device. The device manager may obtain device information associated with the node device based on detecting the connection between the node device and the host device. The device manager may create a connection object associated with the connection. The device manager may generate, based on the device information, a mapping entry that maps the connection object to the node device. The device manager may create a session associated with using the connection to perform an operation on the node device. The device manager may communicate with the node device in the session, based at least in part on the mapping entry, to cause the operation to be performed on the node device.

20 Claims, 12 Drawing Sheets

| Name | Device ID | Connection object info | Connection mechanism |
|---|---|---|---|
| flashDev1 | abcd@#$% | C1234, flash | webUSB |

ND 106-1 name (e.g., from user)

ND 106-1 device ID (e.g., from device info)

Connection A ID, operation, properties (e.g., methods)

Connection mechanism for connection A

FIG. 1B

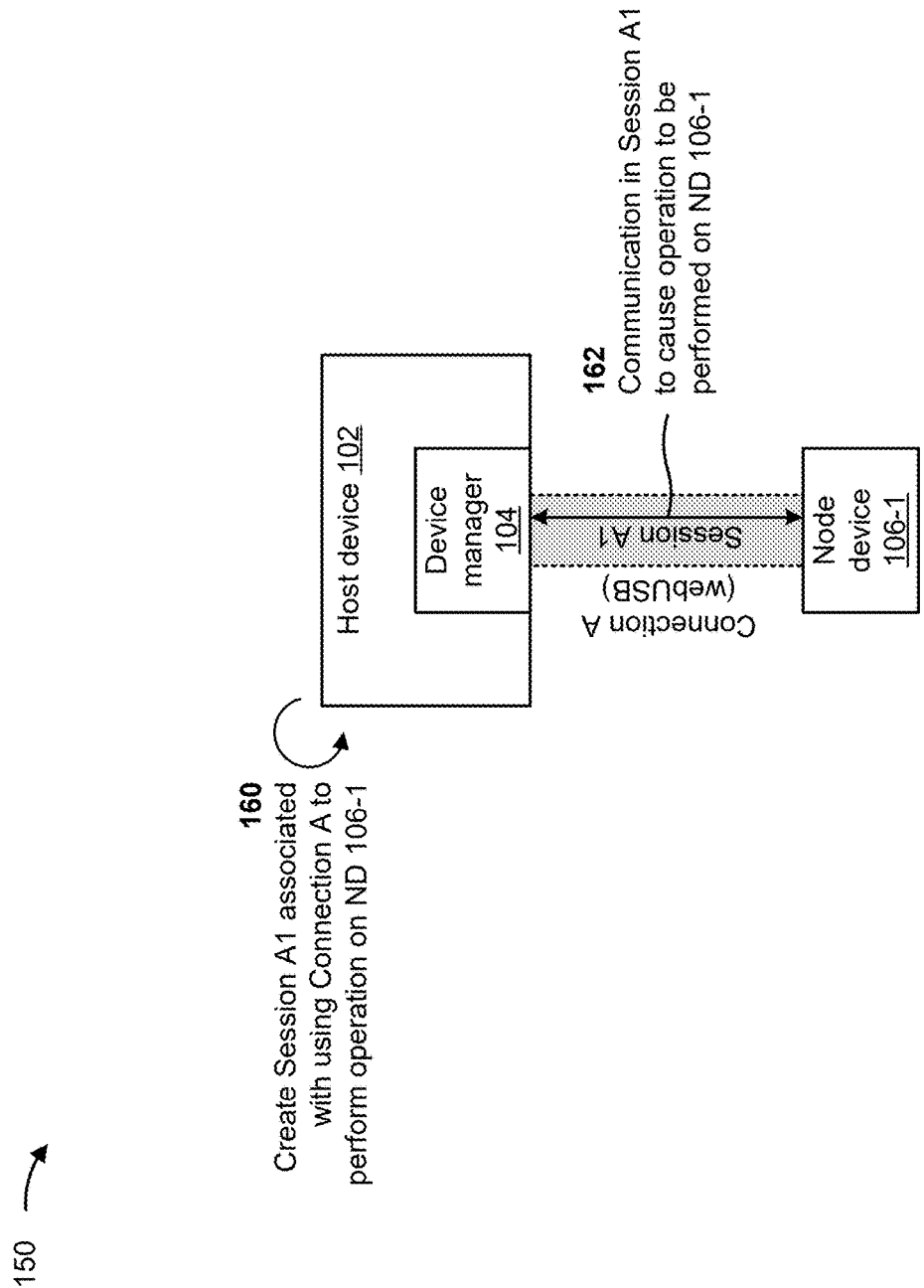

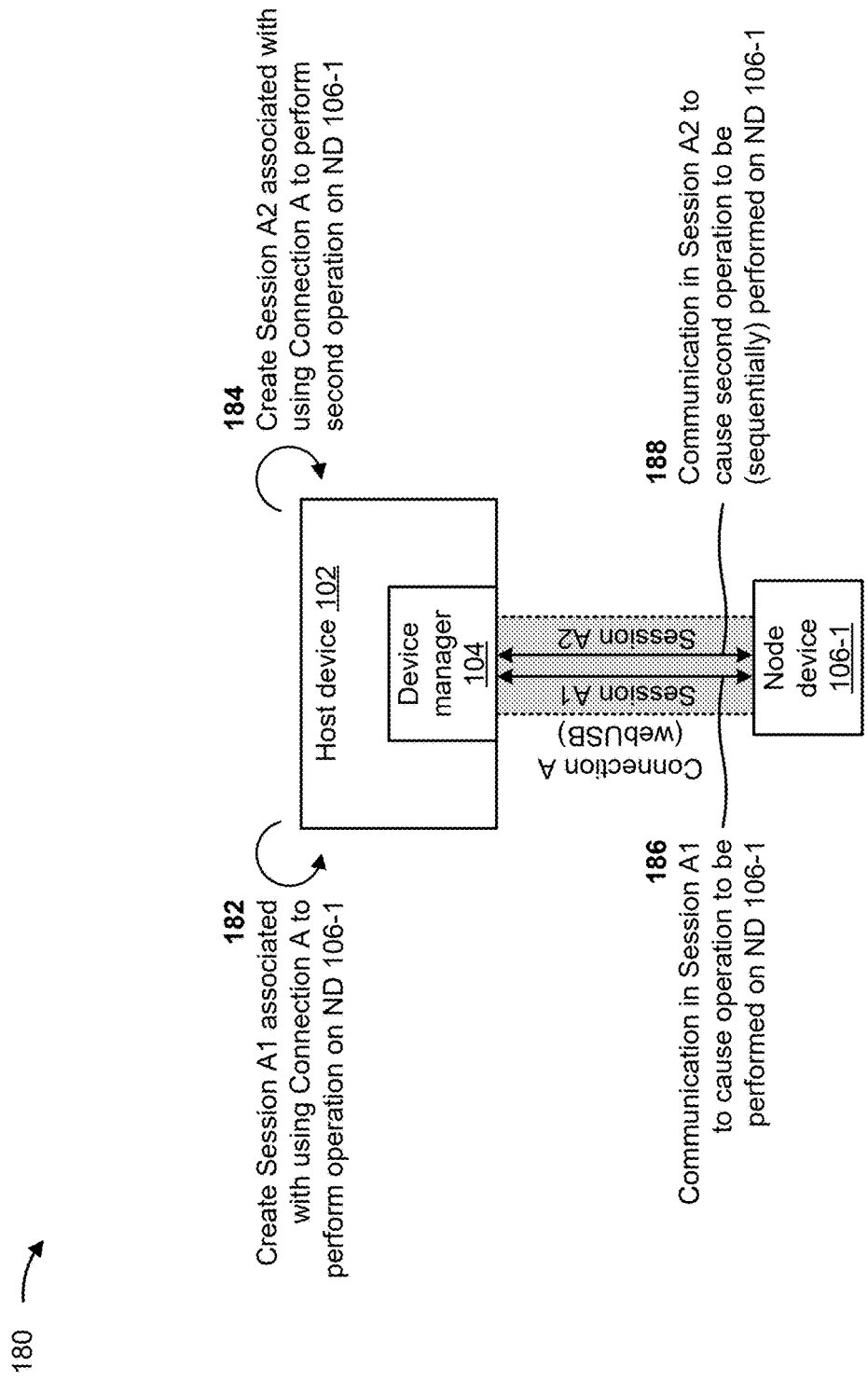

DEVICE MANAGER

BACKGROUND

Typically, in order to perform an operation on a connected hardware device, a user is required to download and install one or more applications on a user device to enable the operation to be performed on the connected hardware device via a connection between the hardware device and the user device. As one example, to flash a binary file to a microcontroller, a user is typically required to download and install one or more applications on a laptop device, after which the user can flash the binary file to the microcontroller via a connection between the microcontroller and the laptop using the one or more applications.

SUMMARY

In some implementations, a device includes one or more memories, and one or more processors, communicatively coupled to the one or more memories, configured to: detect a connection between a node device and a host device; obtain device information associated with the node device based on detecting the connection between the node device and the host device; create a connection object associated with the connection; generate, based on the device information, a mapping entry that maps the connection object to the node device; create a session associated with using the connection to perform an operation on the node device; and communicate with the node device in the session, based at least in part on the mapping entry, to cause the operation to be performed on the node device.

In some implementations, a method includes detecting, by a device manager, a connection between a node device and a host device; obtaining, by the device manager, device information associated with the node device based on detecting the connection between the node device and the host device; creating, by the device manager, a connection object associated with the connection; generating, by the device manager and based on the device information, a mapping entry that maps the connection object to the node device; creating, by the device manager, a session associated with using the connection to perform an operation on the node device; and communicating, by the device manager, with the node device in the session, based at least in part on the mapping entry, to cause the operation to be performed on the node device.

In some implementations, a non-transitory computer-readable medium storing a set of instructions includes one or more instructions that, when executed by one or more processors of a device manager, cause the device manager to: detect a connection between a node device and a host device; obtain device information associated with the node device based on detecting the connection between the node device and the host device; create a connection object associated with the connection; generate, based on the device information, a mapping entry that maps the connection object to the node device; create a session associated with using the connection to perform an operation on the node device; and communicate with the node device in the session, based at least in part on the mapping entry, to cause the operation to be performed on the node device.

BRIEF DESCRIPTION OF THE DRAWINGS

FIGS. 1A-1I are diagrams associated with example operations of a device manager described herein.

DETAILED DESCRIPTION

Figure 1A:
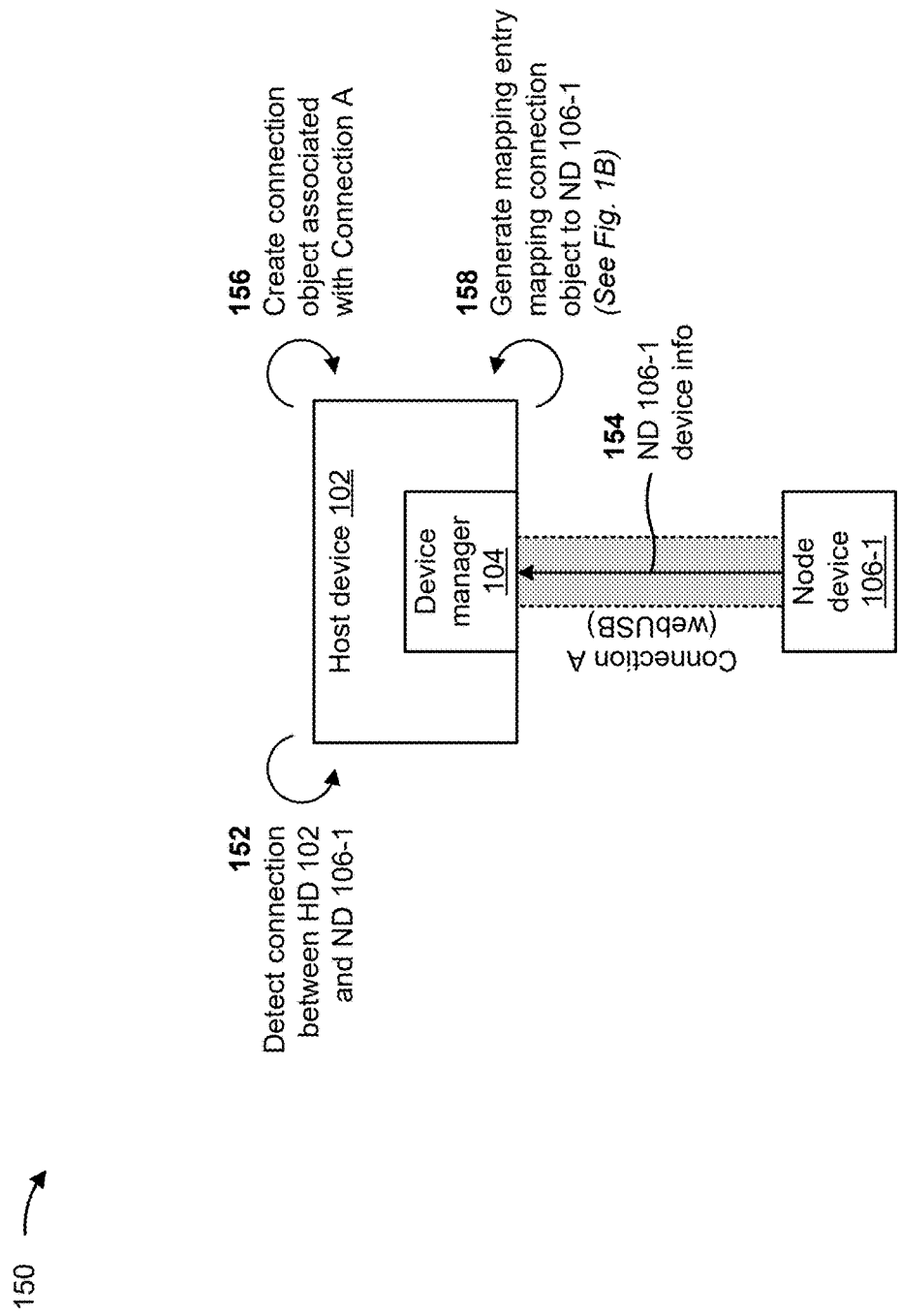

The following detailed description of example implementations refers to the accompanying drawings. The same reference numbers in different drawings may identify the same or similar elements.

As noted above, in order to perform an operation on a connected hardware device, a user typically needs to download and install one or more applications on a user device to enable the operation to be performed on the connected hardware device via a connection between the hardware device and the user device. Such operations may include, for example, flashing a file to the connected hardware device, reading communication (COM) port data from the connected hardware device, writing COM port data to the connected hardware device, performing debugging associated with the connected hardware device, or another type of hardware operation. Conventionally, a given application enables the user to cause a single operation to be performed on a single connected hardware device at a given time. Thus, if the user needs to perform operations on multiple hardware devices, this becomes a painstaking process of selecting hardware devices, creating new sessions for each operation for each connected hardware device, and performing operations one at a time. Furthermore, this approach does not readily enable the user to identify a given connected hardware device at a given time, as there is typically no mechanism available to assign a user-friendly identifier to a given hardware device. Currently-available web-based applications for performing such operations on a connected hardware device are limited and suffer from the same issues.

Consequently, current approaches do not provide (1) a queue-based approach to concurrently perform operations on multiple connected hardware devices, (2) assignment of a user-friendly identifier to a given connected hardware device (e.g., to enable identification of a given connected hardware device by the user), (3) a capability of performing operations on different connected hardware devices using a single application, (4) a capability of concurrently handling the performance of multiple different operations (e.g., flash, read, write, or the like) on different connected hardware devices, (5) the use of a user-friendly connected hardware device identifier in association with performing a given operation, or (6) a capability of causing operations to be performed on connected hardware devices using a web-based application without a need to download and install additional software.

Existing applications for facilitating the performance of operations on connected hardware devices are limited and, furthermore, have a number of shortcomings. For example, any update to a given application requires a user to download and install an update on a local system. As another example, a given application may work with a limited number of operating systems (e.g., the same application may not work for all operating systems). As another example, existing web-based applications only enable performing a reading from a serial port, meaning that bi-directional communication is not possible. As another example, flashing a hex file to a connected hardware device is not supported in existing web-based applications. As another example, multiple instances of the same application need to be started in order to support more than one connection to a given user device. As another example, existing web-based flash applications require a user to download and install software that runs on a local system-meaning that operating system compatibility becomes an issue. As another example, there is no existing application that enables flashing of a hex file to a connected hardware device from a mobile device (e.g., an Android device or an iOS device).

Some implementations described herein provide a device manager. In some implementations, the device manager is capable of handling concurrent connections to multiple connected hardware devices such that operations (e.g., flashing, reading, writing, debugging or the like) can be performed on each connected hardware device. Further, in some implementations, the device manager is capable of creating and managing multiple sessions for a given connected hardware device such that multiple (sequential) operations can be performed on the given connected hardware device using the same connection. In some implementations, the device manager enables use of user-friendly device identifiers (IDs), thereby improving user experience. Further, the device manager may be web-based, meaning that operations can be performed via the Internet without a need to download and install software on the user side. Additionally, the device manager described herein enables one or more operations to be performed on one or more connected hardware devices using a mobile device (e.g., an Android device, an iOS device, or the like). Additional details are provided below.

FIGS. 1A-1I are diagrams associated with example operations of a device manager described herein. As shown in FIG. 1A, the example 150 includes a host device 102 comprising a device manager 104, and a first node device 106-1. The host device 102 may be, for example, a user device, such as mobile phone, a tablet, a laptop computer, a desktop computer, or the like. The device manager 104 may be a component (e.g., a pluggable software component) that is between an application interface running on a browser of the host device 102 and a communication layer of the host device 102 that ensures communication with a given node device 106 using a respective connection. A node device 106 (e.g., the first node device 106-1) may be a hardware device, such as a microcontroller, a controller, or a sensor, among other examples. These devices are described in more detail below in connection with FIG. 2 and FIG. 3.

As shown in FIG. 1A at reference 152, the device manager 104 may detect a connection between the first node device 106-1 and the host device 102. That is, the host device 102 may detect that a connection between the host device 102 and the first node device 106-1 has been established. In some implementations, the connection may be, for example, a Universal Serial Bus (USB) connection, a Near Field Communication (NFC) connection, a serial connection, a Bluetooth connection, an Ethernet connection, or another type of wireless or wired connection. In some implementations, the device manager 104 may identify a connection type associated with the connection in association with detecting the connection. In some implementations, the connection is supported by a browser abstraction layer of the host device 102 that uses an application programming interface (API) corresponding to the connection type (e.g., webUSB, webNFC, webSerial, webBluetooth, or the like). In the example shown in FIG. 1A, the device manager 104 detects a USB connection between the first node device 106-1 (identified as Connection A in FIG. 1A), and the connection is supported using the webUSB API.

As shown at reference 154, the device manager 104 may obtain device information associated with the node device 106 based on detecting the connection between the node device 106 and the host device 102. That is, the device manager 104 may retrieve information associated with the node device 106 based on detecting the connection (i.e., the detection of the connection may trigger the host device 102 to retrieve device information associated with the node device 106 from the node device 106).

Device information includes information associated with a node device 106 or one or more characteristics of the node device 106. For example, in some implementations, the device information may include vendor information associated with the node device 106 (e.g., a name of a vendor of the node device 106, a vendor ID associated with the vendor, or the like). As another example, the device information may include product information associated with the node device 106 (e.g., a name of a product associated with the node device 106, a product ID associated with the product, or the like). As another example, the device information may include a device identifier associated with the node device 106 (e.g., a unique device ID). As another example, the device information may include manufacturer information associated with the node device 106 (e.g., a name of a manufacturer of the node device 106). As another example, the device information may include class information associated with the node device 106 (e.g., information that indicates a class of the node device 106, information that indicates a sub-class of the node device 106, or the like). As another example, the device information may include a user-friendly name for the node device 106 (e.g., a name for the node device 106 as defined by the user and obtained via user input). As another example, the device information may include a serial number associated with the node device 106. As another example, the device information may include metadata associated with the node device 106. In the example of FIG. 1A, the device manager 104 retrieves device information, associated with the first node device 106-1, that includes a user-friendly name for the first node device 106-1 (e.g., flashDev1) and a device ID of the first node device 106-1 (e.g., abcd@ #$ %).

In some implementations, the device manager 104 obtains the device information based on requesting the device information from the node device 106. For example, upon detecting the connection between the first node device 106-1 and the host device 102, the device manager 104 may send, to the first node device 106-1 via the connection, a request for device information associated with the first node device 106-1. The first node device 106-1 may then provide the device information in response to the request from the device manager 104.

As shown at reference 156, the device manager 104 may create a connection object associated with the connection. A connection object is an object that stores information associated with the connection between a node device 106 and the host device 102. For example, a connection object may include a connection ID associated with the connection. As another example, the connection object may include information associated with one or more properties of the connection. As another example, the connection object may include node device operation information associated with a session that uses the connection. The node device operation information may include information associated with an operation that is to be performed using the connection. In the example of FIG. 1A, the device manager 104 creates a connection object that includes information, associated with connection A, that includes a connection ID (e.g., C1234) and node device operation information indicating that connection A is be used to perform a flashing operation on the first node device 106-1. In some implementations, the device manager 104 may determine one or more items of information to be included in the connection object in association with detecting the connection (e.g., the device manager 104 may determine the connection ID as part of detecting the connection). Additionally, or alternatively, the device manager 104 may determine one or more items of information to be included in the connection object based on user input (e.g., the device manager 104 may determine the node device operation information based on user input indicating that the first node device 106-1 is to be flashed).

As shown at reference 158, the device manager 104 may generate a mapping entry associating the connection with the node device 106. In some implementations, a mapping entry includes information that maps the connection object to a node device 106. In some implementations, the device manager 104 may generate the mapping entry based on information associated with the connection and/or based on the device information. For example, the device manager 104 may generate the mapping entry to include a user-friendly name for the node device 106 (e.g., a name for the node device 106 obtained via user input). As another example, the device manager 104 may generate the mapping entry to include the device ID associated with the node device 106. As another example, the device manager 104 may generate the mapping entry to include information associated with the connection object associated with the connection. As another example, the device manager 104 may generate the mapping entry to include information associated with the connection mechanism of the connection (e.g., webUSB, webNFC, webSerial, webBluetooth, Ethernet, or the like).

FIG. 1B is a diagram illustrating an example of a mapping entry associating connection A with the first node device 106-1. In FIG. 1B, the mapping entry includes the user-friendly name for the first node device 106-1 (e.g., flashDev1), the device ID associated with the first node device 106-1 (e.g., abcd@ #$ %), the connection object associated with the first node device 106-1 (e.g., C1234, flash), and an indication of the connection mechanism of connection A (e.g., webUSB).

As shown in FIG. 1C at reference 160, the device manager 104 may create a session associated with using the connection to perform an operation on the node device 106. That is, the device manager 104 may create a session that enables communication between the host device 102 and the node device 106 using the connection. In the example shown in FIG. 1A, the device manager 104 creates a session A1 that enables communication between the host device 102 and the first node device 106-1 using connection A. In some implementations, to support multiple sessions for a node device 106 (e.g., to enable multiple operations to be performed on the node device 106, each in a different session) the device manager 104 may create a session object in association with creating the session. In such a scenario, the device manager 104 may generate the mapping entry such that the mapping entry maps the session object to the node device 106. Additional details regarding support for multiple sessions using session objects are provided below with respect to FIGS. 1F-1G.

As shown at reference 162, the device manager 104 (or the host device 102) may communicate with the node device 106 in the session, based at least in part on the mapping entry, to cause the operation to be performed on the node device 106. For example, with respect to the example in FIGS. 1A-1C, the device manager 104 and/or the host device 102 may communicate with the first node device 106-1 in the session, based at least in part on the mapping entry that associates connection A with the first node device 106-1, to cause the flash operation to be performed on the first node device 106-1.

In some implementations, in association with causing an operation to be performed on the node device 106, the device manager 104 may implement one or more wrapper functions, such as flash ( ) read ( ) or write ( ) among other examples. In some implementations, a wrapper function abstracts the connection mechanism associated with the node device 106 and a browser abstraction layer, and enables handling of multiple node devices 106 connected to a single instance of application software. As one example, flashing may utilize a wrapper function called flash ( ) in the device manager 104, which utilizes a given connection mechanism (e.g., webUSB, webNFC, webBluetooth, webSerial, Ethernet, or the like) to flash a file to the node device 106. As another example, reading data from the node device 106 device may be achieved using a wrapper function such as listen ( ) that reads data utilizing a given connection mechanism. As another example, writing data to the node device 106 may be achieved using a wrapper function such as write ( ) that writes data utilizing a given connection mechanism.

In some implementations, the device manager 104 may communicate with the node device 106 in the session based at least in part on the user-friendly name for the node device 106. For example, the user-friendly name can be invoked from a software application layer (e.g., based on user input) and the device manager 104 may perform the operation on the node device 106 utilizing the stored connection with the node device 106 as indicated by the mapping entry.

In some implementations, operations of the device manager 104 as described with respect to FIGS. 1A-1C enable handling concurrent connections to multiple node devices 106 such that operations (e.g., flashing, reading, writing, debugging or the like) can be performed on each node device 106. That is, the device manager 104 enables multiple node devices 106 to be connected to the host device 102 concurrently such that one or more operations can be performed on each of the multiple connected node devices 106.

Figure 1D:
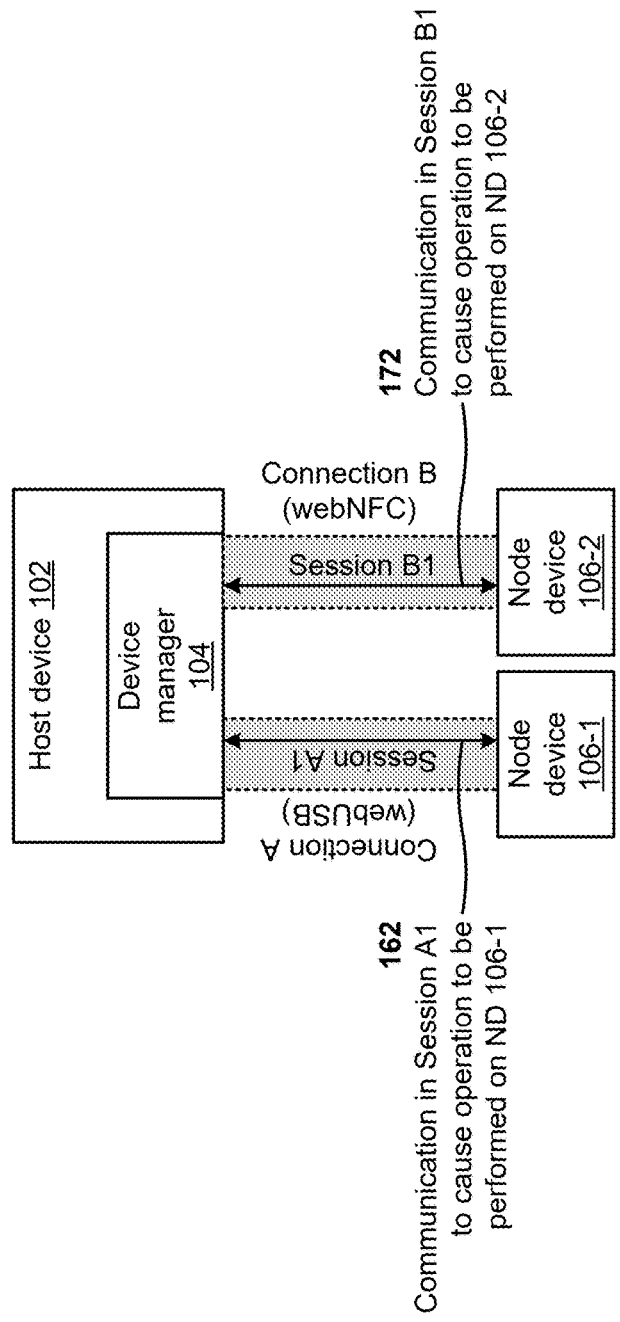
Figure 1E:
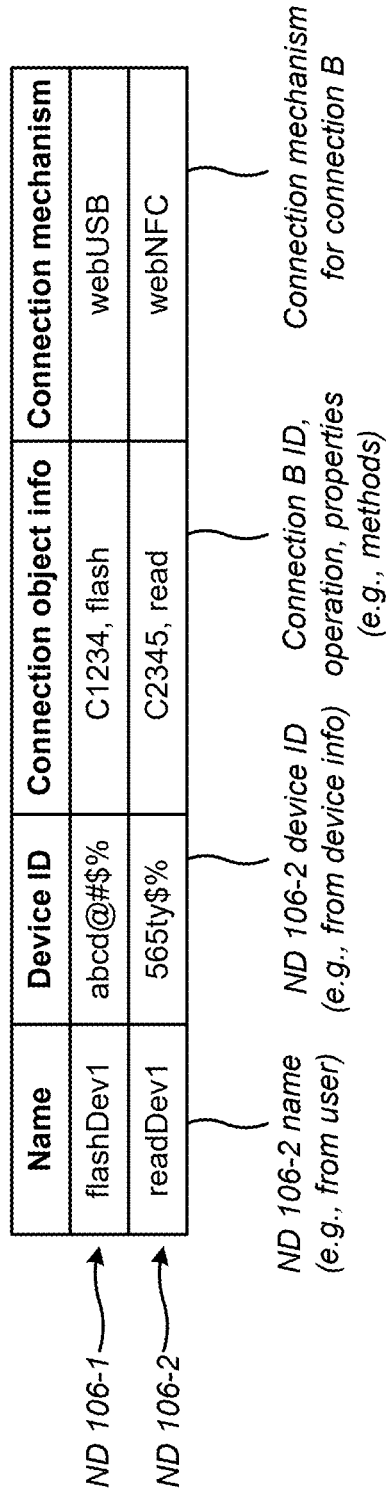

FIGS. 1D-1E are diagrams associated with an example 170 in which the device manager 104 supports operations being performed on multiple node devices 106 that are concurrently connected to the host device 102. In the example shown in FIG. 1D, a second node device 106-2 is connected to the host device 102.

In some implementations, the device manager 104 may perform operations similar to those described with respect to FIG. 1A in association with the second node device 106-2. For example, the device manager 104 may detect a second connection between the second node device 106-2 and the host device 102. The device manager 104 may then obtain second device information associated with the second node device 106-2 based on detecting the second connection. The device manager 104 may then create a second connection object associated with the second connection. The device manager 104 may then generate, based on the second device information, a second mapping entry that maps the second connection object to the second node device 106-2. The device manager 104 may create a second session associated with using the second connection to perform a second operation on the second node device 106-2. Finally, the device manager 104 and/or the host device 102 may communicate with the second node device 106-2 in the second session, based at least in part on the second mapping entry, to cause the second operation to be performed on the second node device 106-2. In the example shown in FIG. 1D, the second connection is shown as connection B and is a webNFC connection. In some implementations, the device manager 104 may communicate with the second node device 106-2 in the second session to cause the second operation to be performed on the second node device 106-2 concurrently with the operation being performed on the first node device 106-1. Here, through the use of mapping entries to manage and identify connections with different node devices 106, the device manager 104 enables operations to be concurrently performed on multiple different node devices 106, while the multiple different node devices 106 are connected to the host device 102 concurrently.

FIG. 1E is a diagram illustrating an example of a mapping entry associating connection B with the second node device 106-2. In FIG. 1E, the mapping entry includes a user-friendly name for the second node device 106-2 (e.g., readDev1), a device ID associated with the second node device 106-2 (e.g., 565*ty*$ %), a connection object associated with the second node device 106-2 (e.g., C2345, read), and an indication of the connection mechanism of connection B (e.g., webNFC).

In this way, the device manager 104 may enable the same or different operations to be performed on multiple node devices 106 at the same time in parallel, the same or different operations on multiple node devices 106 each connected to the host device 102 via different connections at the same time, and/or the same or different operations to be performed on multiple different node devices 106, each enabled with a different debug protocol, at the same time.

In some implementations, the device manager 104 enables multiple (sequential) operations to be performed on a given node device 106 using the same connection. In some implementations, such a capability is provided through creation and management of multiple sessions for the connection with the given node device 106.

Figure 1G:
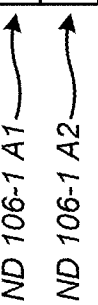

FIGS. 1F-1G are diagrams associated with an example 180 in which the device manager 104 supports multiple operations being performed on a single node device106 that is connected to the host device 102. In some implementations, the device manager 104 uses session objects to manage multiple sessions for the connection with the node device 106. For example, when creating a session associated with a connection (e.g., as described above with reference 160 of FIG. 1C), the device manager 104 may in some implementations create a session object associated with the session. The device manager 104 may generate the mapping entry to include the session object associated with the session (e.g., such that the mapping entry maps the session object to the node device 106 and/or to the connection).

A session object is an object that stores information associated with a session that is to use a connection between a node device 106 and the host device 102 in association with performing an operation. For example, a session object may include a session ID associated with the session. As another example, the session object may include information associated with one or more properties of the session. As another example, the session object may include node device operation information associated with the session. The node device operation information may include information associated with an operation that is to be performed in the session (e.g., details of the particular operation that is to be performed). In some implementations, associating details of the operation with the session (rather than the connection) means that the use of sessions abstracts the connection and enables operations to be handled in an abstract manner by utilizing the same connection (when available).

In the example of FIG. 1F, the device manager 104 has detected connection A between the first node device 106-1 and the host device 102, obtained device information associated with the first node device 106-1, and created a connection object associated with connection A (e.g., in a manner similar to that described above with respect to FIG. 1A). In this example, the connection object includes a connection ID associated with the connection (e.g., C1234).

Here, as shown by reference 182, the device manager 104 creates a first session object associated with a first session (e.g., session A1) that is to use connection A in association with performing a first operation. The device manager 104 then generates a first mapping entry associating session A1 with connection A and the first node device 106-1. Here, the first mapping entry includes the session object for session A1. As shown at reference 184, the device manager 104 may also create a second session object associated with a second session (e.g., session A2) that is to use connection A in association with performing a second operation on the first node device 106-1. The device manager 104 then generates a second mapping entry associating session A2 with connection A and the first node device 106-1. Here, the second mapping entry includes the session object for session A2.

As shown at reference 186, the device manager 104 and/or the host device 102 may communicate with the first node device 106-1 in session A1 (e.g., based on the first session object included in the mapping entry) to cause the first operation to be performed on the first node device 106-1. As shown at reference 188, the device manager 104 and/or the host device 102 may then communicate with the first node device 106-1 in session A2 (e.g., based on the second session object included in the mapping entry) to cause the second operation to be performed on the first node device 106-1. Here, through the use of the mapping entries that map sessions to the connection and the first node device 106-1, the device manager 104 enables multiple operations to be sequentially performed on the same node device 106 using the same connection.

In some implementations, the device manager 104 may cause multiple operations to be performed sequentially in different sessions using the same connection based on a queue associated with managing operations to be performed on the node device 106. In some implementations, to perform more than one operation on the same node device 106, each mapping entry may be assigned a connection ID and a session ID. In some implementations, a user-friendly name and device ID may be assigned to each mapping entry (e.g., to each connection-session combination), with each mapping entry including details of different operations that are to be performed on the node device 106. In some implementations, because multiple operations may need to be performed on the same node device 106, the device manager 104 may utilize a queue (e.g., a first-in, first-out (FIFO) queue) in association with causing the operations to be performed sequentially on the node device 106. In some implementations, the device manager 104 may provide (e.g., in real-time or near real-time) information indicating a position of a given operation in the queue for display to a user (e.g., via the host device 102). In some implementations, the user may provide (e.g., via the host device 102) input indicating that an operation (session) is to be removed from the queue by providing an indication to disable the association session or by removing the session entirely. In such a scenario, the device manager 104 may remove the associated operation from the queue according to the user input.

FIG. 1G is a diagram illustrating an example of the mapping entries associating sessions A1 and A2 with connection A and the first node device 106-1, as described with respect to the example of FIG. 1F. In FIG. 1G, the first mapping entry includes a user-friendly name indicating the first operation to be performed on the first node device 106-1 (e.g., flashDev1), a device ID associated with the first node device 106-1 (e.g., abcd@ #$ %), the connection object associated with the first node device 106-1 (e.g., C2345), the first session object associated with session A1 (e.g., S698, flash), and an indication of the connection mechanism of connection A (e.g., webUSB). As further shown, the second mapping entry includes a user-friendly name indicating the second operation to be performed on the first node device 106-1 (e.g., readDev1), the device ID associated with the first node device 106-1 (e.g., abcd@ #$ %), the connection object associated with the first node device 106-1 (e.g., C2345), the second session object associated with session A2 (e.g., S684, read), and an indication of the connection mechanism of connection A (e.g., webUSB). Notably, in this example, the node device operation information associated with each session is included in the respective session objects (e.g., rather than the connection object) because these operations are to be performed in different sessions using the same connection.

In this way, the device manager 104 may enable multiple sessions for the same node device 106 such that sequential operations (e.g., flash, read, write, debug, or the like) can be performed on the node device 106.

In some implementations, operations of the device manager 104 as described herein enable both handling concurrent connections to multiple node devices 106 (e.g., such that operations can be performed on each concurrently connected node device 106) and multiple (sequential) operations to be performed on a given node device 106 using the same connection. That is, the techniques described with respect to FIGS. 1A-1G can be combined so as to enable operations to be performed on concurrent connections of multiple node devices 106 as well as to enable multiple (sequential) operations to be performed on a given node device 106 using the same connection.

Figure 1H:
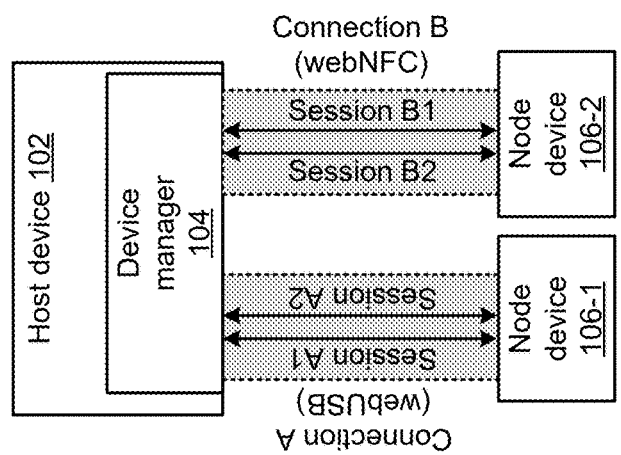
Figure 1I:
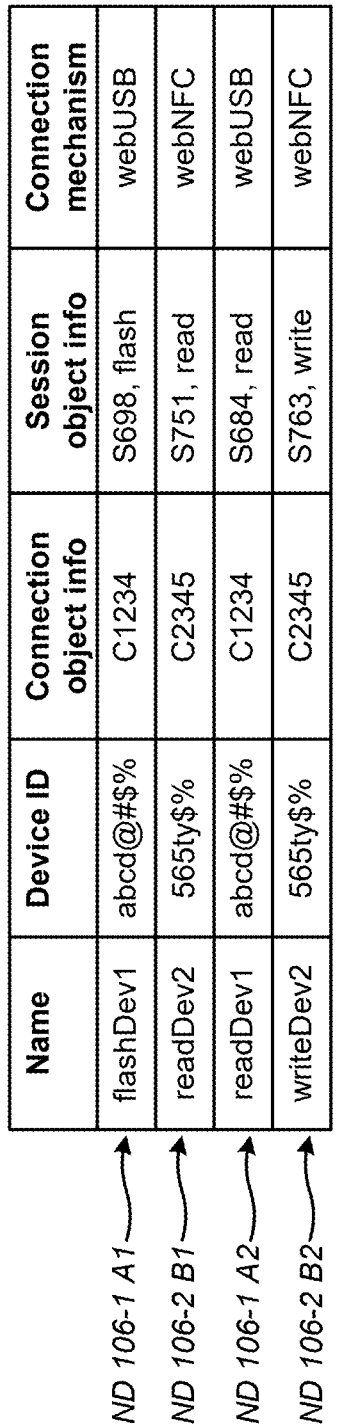

FIGS. 1H-1I are diagram associated with an example 190 in which the device manager 104 supports multiple operations being performed on each of multiple node devices 106 that are concurrently connected to the host device 102.

In the example shown in FIG. 1H, the device manager 104 has detected connection A between the first node device 106-1 and the host device 102, obtained device information associated with the first node device 106-1, and created a connection object associated with connection A (e.g., in a manner similar to that described above with respect to FIG. 1A). Further, the device manager 104 has detected connection B between the second node device 106-2 and the host device 102, obtained device information associated with the second node device 106-2, and created a connection object associated with connection B (e.g., in a manner similar to that described above with respect to FIG. 1A).

In this example, the device manager 104 creates a first session object associated with a first session (e.g., session A1) that is to use connection A in association with performing a first operation, and the device manager 104 then generates a first mapping entry associating session A1 with connection A and the first node device 106-1. Here, the first mapping entry includes the session object for session A1.

The device manager 104 also creates a second session object associated with a second session (e.g., session A2) that is to use connection A in association with performing a second operation on the first node device 106-1. The device manager 104 then generates a second mapping entry associating session A2 with connection A and the first node device 106-1. Here, the second mapping entry includes the session object for session A2.

Further, the device manager 104 creates a third session object associated with a third session (e.g., session B1) that is to use connection B in association with performing a third operation, and the device manager 104 then generates a third mapping entry associating session B1 with connection B and the second node device 106-2. Here, the third mapping entry includes the session object for session B1. The device manager 104 also creates a fourth session object associated with a fourth session (e.g., session B2) that is to use connection B in association with performing a fourth operation on the second node device 106-2. The device manager 104 then generates a fourth mapping entry associating session B2 with connection B and the second node device 106-2. Here, the second mapping entry includes the session object for session B2. FIG. 1I is a diagram illustrating an example of the mapping entries associating sessions A1, A2, B1, and B2 with their respective connections and node devices 106 as described with respect to the example of FIG. 1H.

The device manager 104 and/or the host device 102 may then communicate with the first node device 106-1 and the second node device 106-2 in the various sessions to cause the operations to be performed in the respective sessions via their respective connections. Here, through the use of the mapping entries that map a given session to a connection and node device 106, the device manager 104 enables multiple operations to be sequentially performed on each of multiple node devices 106 using a single connection for each node device 106.

In some implementations, the device manager 104 may receive an indication (e.g., via user input) that a node device 106 is to be disconnected from the host device 102. In such a scenario, the device manager 104 may in some implementations determine whether the operation is in progress, and may selectively close the connection and the session based on whether the operation is in progress. For example, an instruction to disconnect the first node device 106-1 may be received at the device manager 104, and the device manager 104 may determine whether any session associated with the first node device 106-1 is active (e.g., whether any operations are still in progress). In a scenario in which one or more operations are in progress, the device manager 104 may prevent the disconnection. In this way, uninterrupted data flow and operations between a node device 106 can be ensured (e.g., to prevent damage to the node device 106). In a scenario in which no operations are in progress on the node device 106 when the instruction to disconnect is received by the device manager 104, the device manager 104 may close the connection and any sessions associated with the connection safely.

In some implementations, the device manager 104 may provide an option to save details associated with a given node device 106, thereby enabling automatic detection as soon as the given node device 106 is reconnected (e.g., at a later time). In some implementations, this automatic detection capability enables the device manager 104 to map and store connection mechanism information associated with an open connection and a given set of device information.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
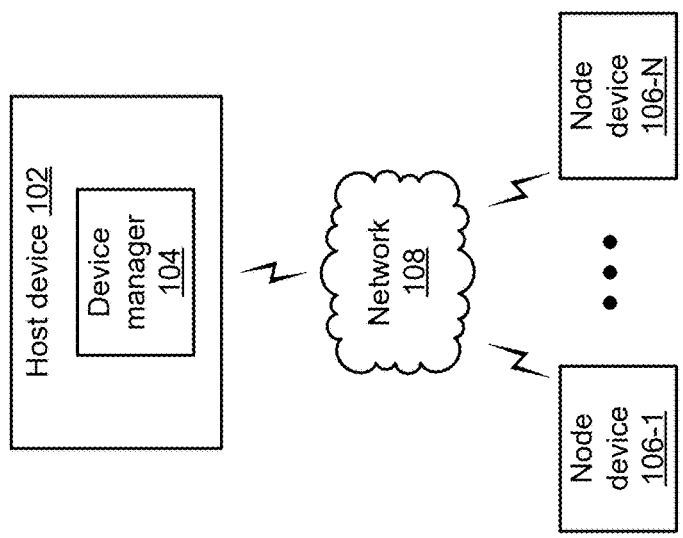
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the host device 102 comprising the device manager 104, one or more node devices 106-1 through 106-N(N≥1), and a network 108. Devices of environment 200 may interconnect via wired connections, wireless connections, or a combination of wired and wireless connections.

The host device 102 may include one or more devices capable of receiving, generating, storing, processing, and/or providing information associated with operations performed by a device manager 104, as described elsewhere herein. The host device 102 may include a communication device and/or a computing device. For example, the host device 102 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the host device 102 is capable of being connected to one or more node devices 106 to enable the device manager 104 and/or the host device 102 to cause one or more operations to be performed on the node device 106. In some implementations, a connection between the host device 102 and a given node device 106 may be, for example, a webUSB connection, a webNFC connection, a webSerial connection, a webBluetooth connection, an Ethernet connection, or another type of wireless or wired connection. In some implementations, the host device 102 comprises the device manager 104.

The device manager 104 includes a device that enables handling of concurrent connections to multiple node devices 106 such that operations can be performed on each node device 106 and/or that enables multiple (sequential) operations to be performed on a given node device 106 using the same connection, as described herein. In some implementations, the device manager 104 may comprise one or more components (e.g., a pluggable software component) between an application layer (e.g., application software) and a browser abstraction layer (e.g., for device communication protocol) in a protocol stack associated with the host device 102. Additionally, or alternatively, the device manager 104 may be between the application layer and a debugging abstraction layer (e.g., for enabling support for different debugging protocols). Thus, in some implementations, the device manager 104 may support communication with any connected node device 106 with any connection mechanism or debugging protocol. In some implementations, the device manager 104 operates between application programming interfaces (APIs) of a browser of the host device 102 that support communication between the host device 102 and the node device 106 using a variety of connection mechanisms.

A node device 106 may include one or more devices capable of receiving, generating, storing, processing, and/or providing information associated with operations performed by a device manager 104, as described elsewhere herein. For example, the node device 106 may include a connected hardware device, such as a controller, a microcontroller, a control unit, a sensor, or another type of device. In some implementations, the node device 106 is capable of being connected to the host device 102 to enable one or more operations to be caused to be performed on the node device 106 (e.g., by the device manager 104 and/or the host device 102). In some implementations, a connection between the node device 106 and the host device 102 may be, for example, a webUSB connection, a webNFC connection, a webSerial connection, a webBluetooth connection, an Ethernet connection, or another type of wireless or wired connection.

The network 108 may include one or more wired and/or wireless networks. For example, the network 108 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 108 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
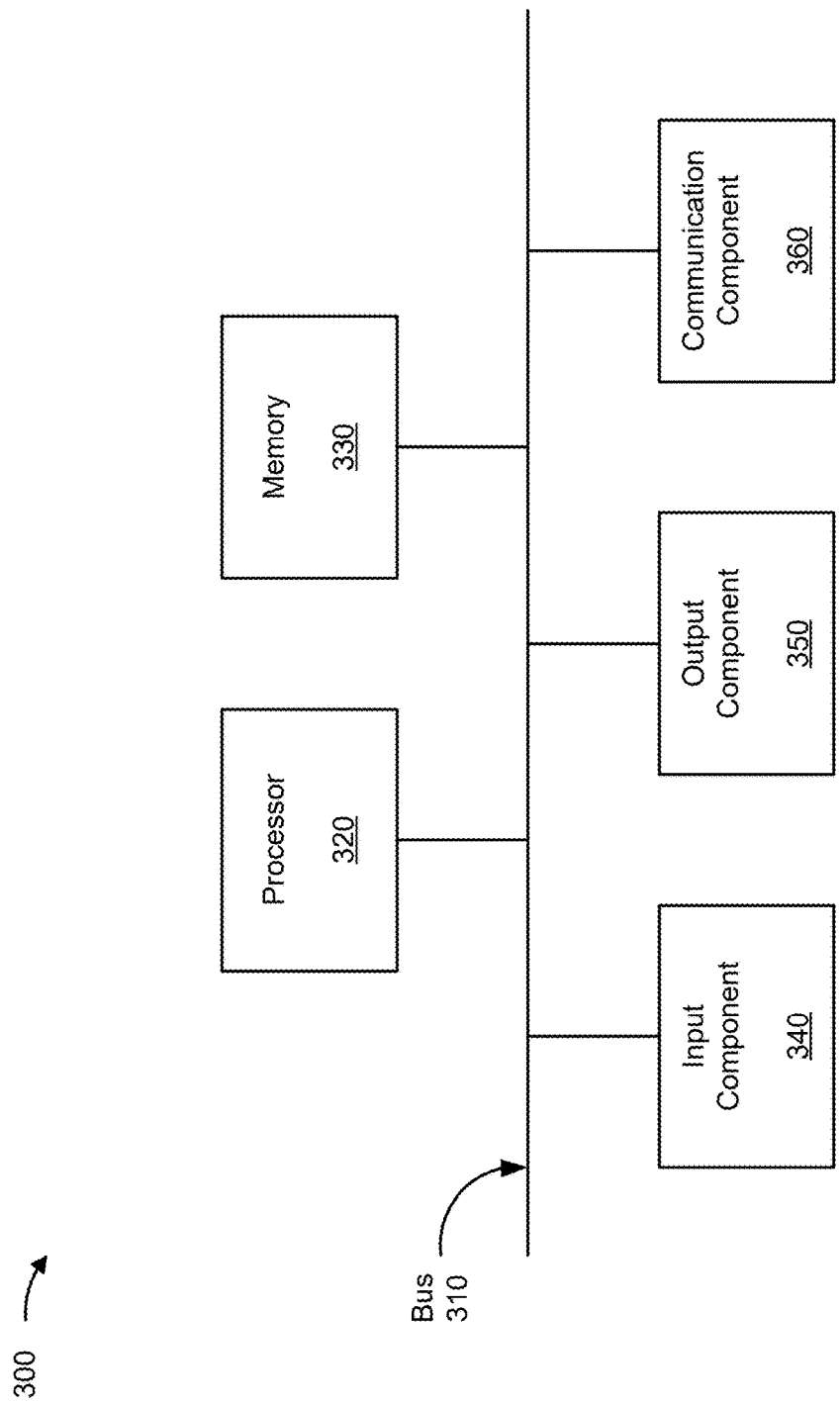
FIG. 3 is a diagram of example components of one or more devices described herein.

FIG. 3 is a diagram of example components of a device 300. The device 300 may correspond to the host device 102, the device manager 104, and/or a node device 106. In some implementations, the host device 102, the device manager 104, and/or the node device 106 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
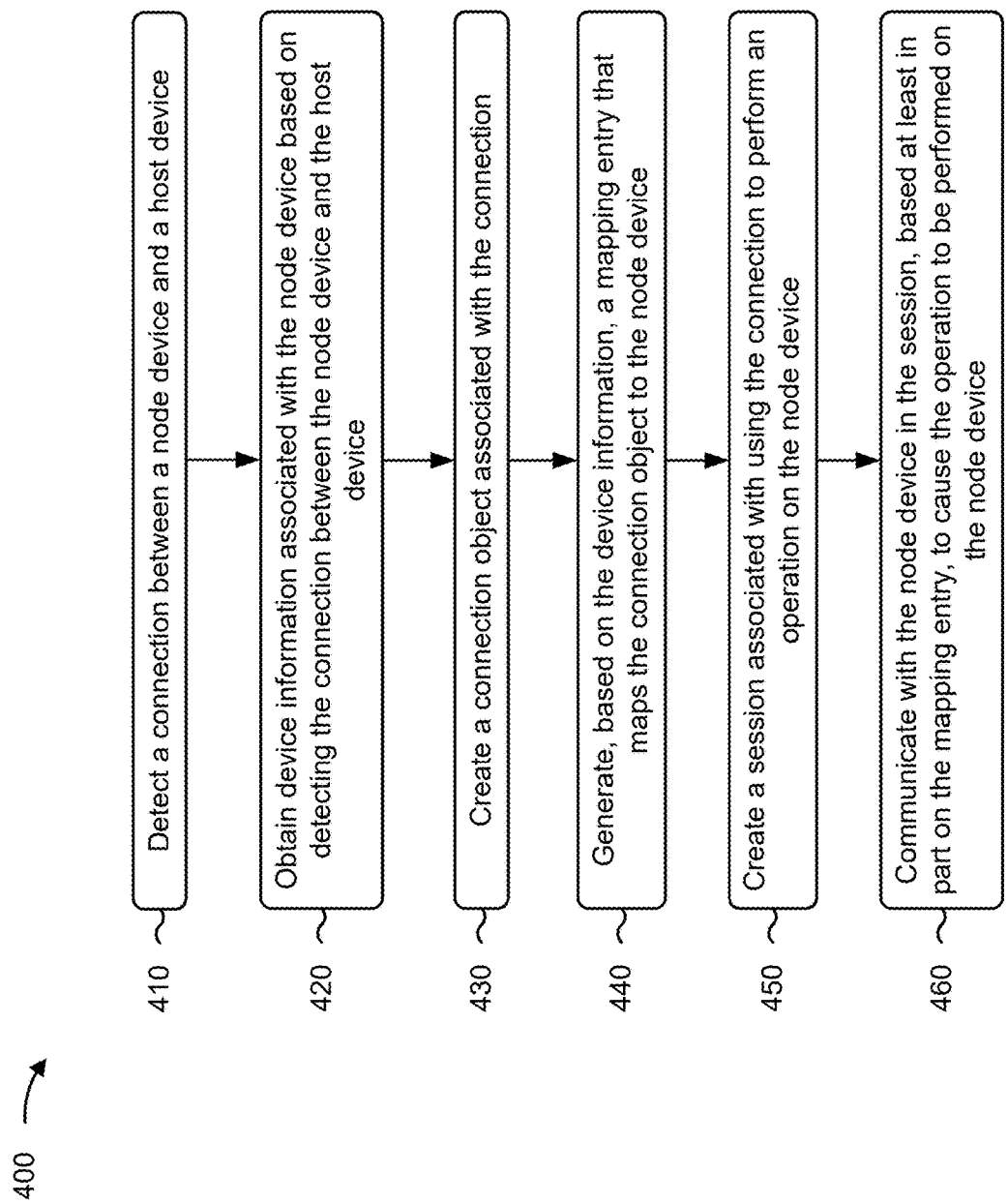
FIG. 4 is a flowchart of an example process associated with operation of a device manager described herein.

FIG. 4 is a flowchart of an example process 400 associated with operation of a device manager described herein. In some implementations, one or more process blocks of FIG. 4 are performed by the device manager (e.g., a device manager 104). In some implementations, one or more process blocks of FIG. 4 are performed by another device or a group of devices separate from or including the device manager, such as a host device (e.g., the host device 102), and/or a node device (e.g., a node device 106). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include detecting a connection between a node device and a host device (block 410). For example, the device manager may detect a connection between a node device and a host device, as described above.

As further shown in FIG. 4, process 400 may include obtaining device information associated with the node device based on detecting the connection between the node device and the host device (block 420). For example, the device manager may obtain device information associated with the node device based on detecting the connection between the node device and the host device, as described above.

As further shown in FIG. 4, process 400 may include creating a connection object associated with the connection (block 430). For example, the device manager may create a connection object associated with the connection, as described above.

As further shown in FIG. 4, process 400 may include generating, based on the device information, a mapping entry that maps the connection object to the node device (block 440). For example, the device manager may generate, based on the device information, a mapping entry that maps the connection object to the node device, as described above.

As further shown in FIG. 4, process 400 may include creating a session associated with using the connection to perform an operation on the node device (block 450). For example, the device manager may create a session associated with using the connection to perform an operation on the node device, as described above.

As further shown in FIG. 4, process 400 may include communicating with the node device in the session, based at least in part on the mapping entry, to cause the operation to be performed on the node device (block 460). For example, the device manager may communicate with the node device in the session, based at least in part on the mapping entry, to cause the operation to be performed on the node device, as described above.

Process 400 may include additional implementations, such as any single implementation or any combination of implementations described below and/or in connection with one or more other processes described elsewhere herein.

In a first implementation, process 400 includes detecting a second connection between a second node device and the host device, obtaining second device information associated with the second node device based on detecting the second connection, creating a second connection object associated with the second connection, generating, based on the second device information, a second mapping entry that maps the second connection object to the second node device, creating a second session associated with using the second connection to perform a second operation on the second node device, and communicating with the second node device in the second session, based at least in part on the second mapping entry, to cause the second operation to be performed on the second node device.

In a second implementation, alone or in combination with the first implementation, creating the session comprises creating a session object associated with the session, and communicating with the node device comprises communicating with the node device in the session further based on the session object.

In a third implementation, in combination with the second implementation, process 400 includes receiving an indication to create a second session associated with using the connection to perform a second operation on the node device, creating a second session object associated with session, updating the mapping entry to map the second session object to the node device, and communicating with the node device in the second session, based at least in part on the mapping entry and the second session object, to cause the second operation to be performed on the node device.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The following provides an overview of some Aspects of the present disclosure:

Aspect 1: A device, comprising: one or more memories; and one or more processors, communicatively coupled to the one or more memories, configured to: detect a connection between a node device and a host device; obtain device information associated with the node device based on detecting the connection between the node device and the host device; create a connection object associated with the connection; generate, based on the device information, a mapping entry that maps the connection object to the node device; create a session associated with using the connection to perform an operation on the node device; and communicate with the node device in the session, based at least in part on the mapping entry, to cause the operation to be performed on the node device.

Aspect 2: The device of Aspect 1, wherein the device information includes at least one of: vendor information associated with the node device, product information associated with the node device, a device identifier associated with the node device, manufacturer information associated with the node device, class information associated with the node device, a user-friendly name for the node device, a serial number associated with the node device, or metadata associated with the node device.

Aspect 3: The device of any of Aspects 1-2, wherein the connection object includes at least one of: a connection identifier, information associated with one or more properties of the connection, or node device operation information associated with the session.

Aspect 4: The device of any of Aspects 1-3, wherein the mapping entry comprises at least one of: a user-friendly name for the node device, a device identifier, information associated with the connection object, or information associated with a connector mechanism of the connection.

Aspect 5: The device of any of Aspects 1-4, wherein the one or more processors are further configured to: detect a second connection between a second node device and the host device; obtain second device information associated with the second node device based on detecting the second connection; create a second connection object associated with the second connection; generate, based on the second device information, a second mapping entry that maps the second connection object to the second node device; create a second session associated with using the second connection to perform a second operation on the second node device; and communicate with the second node device in the second session, based at least in part on the second mapping entry, to cause the second operation to be performed on the second node device.

Aspect 6: The device of Aspect 5, wherein the one or more processors, to communicate with the second node device in the second session, are configured to communicate with the second node device in the second session to cause the second operation to be performed on the second node device concurrently with the operation being performed on the node device.

Aspect 7: The device of any of Aspects 1-6, wherein the one or more processors, to create the session, are configured to create a session object associated with the session, wherein the mapping entry further maps the session object to the node device.

Aspect 8: The device of Aspect 7, wherein the session object comprises at least one of: a session identifier, information associated with one or more properties of the session, or node device operation information associated with the session.

Aspect 9: The device of Aspect 7, wherein the one or more processors, to communicate with the node device, are further configured to communicate with the node device in the session further based on the session object.

Aspect 10: The device of Aspect 7, wherein the one or more processors are further configured to: receive an indication to create a second session associated with using the connection to perform a second operation on the node device; create a second session object associated with second session; update the mapping entry to map the second session object to the node device; and communicate with the node device in the second session, based at least in part on the mapping entry and the second session object, to cause the second operation to be performed on the node device.

Aspect 11: The device of Aspect 10, wherein the one or more processors, to communicate with the node device in the second session, are configured to communicate with the node device in the second session to cause the second operation to be performed on the node device sequentially with the operation being performed on the node device.

Aspect 12: The device of Aspect 7, wherein the one or more processors, to communicate with the node device in the session, are configured to communicate with the node device in the session based on a queue associated with managing operations to be performed on the node device.

Aspect 13: The device of any of Aspects 1-12, wherein the one or more processors are further configured to obtain a user-friendly name for the node device, wherein the user-friendly name is included in the mapping entry.

Aspect 14: The device of any of Aspects 1-13, wherein the one or more processors are further configured to: receive an indication that the node device is to be disconnected from the host device; determine whether the operation is in progress; and selectively close the connection and the session based on whether the operation is in progress.

Aspect 15: A method, comprising: detecting, by a device manager, a connection between a node device and a host device; obtaining, by the device manager, device information associated with the node device based on detecting the connection between the node device and the host device; creating, by the device manager, a connection object associated with the connection; generating, by the device manager and based on the device information, a mapping entry that maps the connection object to the node device; creating, by the device manager, a session associated with using the connection to perform an operation on the node device; and communicating, by the device manager, with the node device in the session, based at least in part on the mapping entry, to cause the operation to be performed on the node device.

Aspect 16: The method of Aspect 15, further comprising: detecting a second connection between a second node device and the host device; obtaining second device information associated with the second node device based on detecting the second connection; creating a second connection object associated with the second connection; generating, based on the second device information, a second mapping entry that maps the second connection object to the second node device; creating a second session associated with using the second connection to perform a second operation on the second node device; and communicating with the second node device in the second session, based at least in part on the second mapping entry, to cause the second operation to be performed on the second node device.

Aspect 17: The method of any of Aspects 15-16, wherein creating the session comprises creating a session object associated with the session, and wherein communicating with the node device comprises communicating with the node device in the session further based on the session object.

Aspect 18: The method of Aspect 17, further comprising: receiving an indication to create a second session associated with using the connection to perform a second operation on the node device; creating a second session object associated with session; updating the mapping entry to map the second session object to the node device; and communicating with the node device in the second session, based at least in part on the mapping entry and the second session object, to cause the second operation to be performed on the node device.

Aspect 19: A non-transitory computer-readable medium storing a set of instructions, the set of instructions comprising: one or more instructions that, when executed by one or more processors of a device manager, cause the device manager to: detect a connection between a node device and a host device; obtain device information associated with the node device based on detecting the connection between the node device and the host device; create a connection object associated with the connection; generate, based on the device information, a mapping entry that maps the connection object to the node device; create a session associated with using the connection to perform an operation on the node device; and communicate with the node device in the session, based at least in part on the mapping entry, to cause the operation to be performed on the node device.

Aspect 20: The non-transitory computer-readable medium of Aspect 19, wherein the one or more instructions further cause the one or more processors to: detect a second connection between a second node device and the host device; obtain second device information associated with the second node device based on detecting the second connection; create a second connection object associated with the second connection; generate, based on the second device information, a second mapping entry that maps the second connection object to the second node device; create a second session associated with using the second connection to perform a second operation on the second node device; and communicate with the second node device in the second session, based at least in part on the second mapping entry, to cause the second operation to be performed on the second node device.

Aspect 21: A system configured to perform one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a device, cause the device to perform one or more operations recited in one or more of Aspects 1-20.

Aspect 24: A computer program product comprising instructions or code for executing one or more operations recited in one or more of Aspects 1-20.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z." No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items,), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
one or more memories; and
one or more processors, communicatively coupled to the one or more memories, configured to:
detect a connection between a node device and a host device;
obtain device information associated with the node device based on detecting the connection between the node device and the host device;
create a connection object associated with the connection;
generate, based on the device information, a mapping entry that maps the connection object to the node device;
create a session associated with using the connection to perform an operation on the node device; and
communicate with the node device in the session, based at least in part on the mapping entry, to cause the operation to be performed on the node device.

2. The device of claim 1, wherein the device information includes at least one of:
vendor information associated with the node device,
product information associated with the node device,
a device identifier associated with the node device,
manufacturer information associated with the node device,
class information associated with the node device,
a user-friendly name for the node device,
a serial number associated with the node device, or
metadata associated with the node device.

3. The device of claim 1, wherein the connection object includes at least one of:
a connection identifier,
information associated with one or more properties of the connection, or node device operation information associated with the session.

4. The device of claim 1, wherein the mapping entry comprises at least one of:
a user-friendly name for the node device,
a device identifier,
information associated with the connection object, or
information associated with a connector mechanism of the connection.

5. The device of claim 1, wherein the one or more processors are further configured to:
detect a second connection between a second node device and the host device;
obtain second device information associated with the second node device based on detecting the second connection;
create a second connection object associated with the second connection;
generate, based on the second device information, a second mapping entry that maps the second connection object to the second node device;
create a second session associated with using the second connection to perform a second operation on the second node device; and
communicate with the second node device in the second session, based at least in part on the second mapping entry, to cause the second operation to be performed on the second node device.

6. The device of claim 5, wherein the one or more processors, to communicate with the second node device in the second session, are configured to communicate with the second node device in the second session to cause the second operation to be performed on the second node device concurrently with the operation being performed on the node device.

7. The device of claim 1, wherein the one or more processors, to create the session, are configured to create a session object associated with the session, wherein the mapping entry further maps the session object to the node device.

8. The device of claim 7, wherein the session object comprises at least one of:
a session identifier,
information associated with one or more properties of the session, or node device operation information associated with the session.

9. The device of claim 7, wherein the one or more processors, to communicate with the node device, are further configured to communicate with the node device in the session further based on the session object.

10. The device of claim 7, wherein the one or more processors are further configured to:
receive an indication to create a second session associated with using the connection to perform a second operation on the node device;
create a second session object associated with second session;
update the mapping entry to map the second session object to the node device; and
communicate with the node device in the second session, based at least in part on the mapping entry and the second session object, to cause the second operation to be performed on the node device.

11. The device of claim 10, wherein the one or more processors, to communicate with the node device in the second session, are configured to communicate with the node device in the second session to cause the second operation to be performed on the node device sequentially with the operation being performed on the node device.

12. The device of claim 7, wherein the one or more processors, to communicate with the node device in the session, are configured to communicate with the node device in the session based on a queue associated with managing operations to be performed on the node device.

13. The device of claim 1, wherein the one or more processors are further configured to obtain a user-friendly name for the node device, wherein the user-friendly name is included in the mapping entry.

14. The device of claim 1, wherein the one or more processors are further configured to:
receive an indication that the node device is to be disconnected from the host device;
determine whether the operation is in progress; and
selectively close the connection and the session based on whether the operation is in progress.

15. A method, comprising:
detecting, by a device manager, a connection between a node device and a host device;
obtaining, by the device manager, device information associated with the node device based on detecting the connection between the node device and the host device;
creating, by the device manager, a connection object associated with the connection;
generating, by the device manager and based on the device information, a mapping entry that maps the connection object to the node device;
creating, by the device manager, a session associated with using the connection to perform an operation on the node device; and
communicating, by the device manager, with the node device in the session, based at least in part on the mapping entry, to cause the operation to be performed on the node device.

16. The method of claim 15, further comprising:
detecting a second connection between a second node device and the host device;
obtaining second device information associated with the second node device based on detecting the second connection;
creating a second connection object associated with the second connection;
generating, based on the second device information, a second mapping entry that maps the second connection object to the second node device;
creating a second session associated with using the second connection to perform a second operation on the second node device; and
communicating with the second node device in the second session, based at least in part on the second mapping entry, to cause the second operation to be performed on the second node device.

17. The method of claim 15, wherein creating the session comprises creating a session object associated with the session, and wherein communicating with the node device comprises communicating with the node device in the session further based on the session object.

18. The method of claim 17, further comprising:
receiving an indication to create a second session associated with using the connection to perform a second operation on the node device;
creating a second session object associated with session;
updating the mapping entry to map the second session object to the node device; and
communicating with the node device in the second session, based at least in part on the mapping entry and the second session object, to cause the second operation to be performed on the node device.

19. A non-transitory computer-readable medium storing a set of instructions, the set of instructions comprising:
one or more instructions that, when executed by one or more processors of a device manager, cause the device manager to:
detect a connection between a node device and a host device;
obtain device information associated with the node device based on detecting the connection between the node device and the host device;
create a connection object associated with the connection;
generate, based on the device information, a mapping entry that maps the connection object to the node device;
create a session associated with using the connection to perform an operation on the node device; and
communicate with the node device in the session, based at least in part on the mapping entry, to cause the operation to be performed on the node device.

20. The non-transitory computer-readable medium of claim 19, wherein the one or more instructions further cause the one or more processors to:
detect a second connection between a second node device and the host device;
obtain second device information associated with the second node device based on detecting the second connection;
create a second connection object associated with the second connection;
generate, based on the second device information, a second mapping entry that maps the second connection object to the second node device;
create a second session associated with using the second connection to perform a second operation on the second node device; and
communicate with the second node device in the second session, based at least in part on the second mapping entry, to cause the second operation to be performed on the second node device.

* * * * *